United States Patent
Tamura

(10) Patent No.: US 7,502,018 B2
(45) Date of Patent: Mar. 10, 2009

(54) PROJECTOR, ELECTRONIC WHITEBOARD SYSTEM USING PROJECTOR AND METHOD OF ACQUIRING INDICATED POINT

(75) Inventor: Youichi Tamura, Minato-ku (JP)

(73) Assignee: NEC Display Solutions Ltd., Tokyo (JP)

( * ) Notice: Subject to any disclaimer, the term of this patent is extended or adjusted under 35 U.S.C. 154(b) by 777 days.

(21) Appl. No.: 10/968,069

(22) Filed: Oct. 20, 2004

(65) Prior Publication Data

US 2005/0083301 A1    Apr. 21, 2005

(30) Foreign Application Priority Data

Oct. 21, 2003    (JP)    ............................. 2003-360510

(51) Int. Cl.
*G06F 3/033* (2006.01)
*H04N 5/64* (2006.01)

(52) U.S. Cl. ..................... 345/179; 348/744; 178/19.01

(58) Field of Classification Search ................. 345/173, 345/179; 178/19.01, 19.02, 19.05; 348/744
See application file for complete search history.

(56) References Cited

U.S. PATENT DOCUMENTS

| | | | | |
|---|---|---|---|---|
| 6,717,073 B2 * | 4/2004 | Xu et al. | ................... | 178/18.04 |
| 7,075,524 B2 * | 7/2006 | Kobayashi et al. | .......... | 345/173 |
| 7,109,979 B2 * | 9/2006 | Moyne et al. | ................ | 345/179 |
| 2002/0047835 A1 * | 4/2002 | Kawai et al. | ................ | 345/204 |
| 2002/0101412 A1 * | 8/2002 | Tasaki | ......................... | 345/179 |

FOREIGN PATENT DOCUMENTS

| | | | |
|---|---|---|---|
| JP | H11-085395 A | | 3/1999 |
| JP | 2001-125736 A | | 5/2001 |
| JP | 2002-331796 | | 11/2002 |
| JP | 2002-333314 A | | 11/2002 |
| JP | 2003044222 A | * | 2/2003 |

* cited by examiner

*Primary Examiner*—Amr Awad
*Assistant Examiner*—Stephen G Sherman
(74) *Attorney, Agent, or Firm*—Sughrue Mion, PLLC

(57) ABSTRACT

An electronic whiteboard system has light emitting elements mounted on ultrasonic wave receivers of a signal processor, and an imager device for imaging the light emitting elements and a projection test pattern of a projector to acquire a positional relationship between the light emitting elements and an image projected from the projector. The electronic whiteboard system can facilitate initialization of the coordinates with the acquired positional relationship.

3 Claims, 3 Drawing Sheets

PROJECTOR, ELECTRONIC WHITEBOARD SYSTEM USING PROJECTOR AND METHOD OF ACQUIRING INDICATED POINT

BACKGROUND OF THE INVENTION

1. Field of the Invention

The present invention relates to a projector having an electronic whiteboard function, an electronic whiteboard system using the projector, and a method of acquiring an indicated point in the electronic whiteboard system.

2. Description of the Related Art

A coordinate input device made available on the market in recent years has a combination of a signal processor including two ultrasonic wave receivers and one infrared ray receiver with an electronic pen including an infrared ray emitter and an ultrasonic wave generator. This coordinate input device is one implementation of an electronic whiteboard function which measures the distances from the electronic pen to the two ultrasonic wave receivers of the removable signal processor mounted on a whiteboard or the like to acquire the position of the electronic pen, and takes the coordinates of the electronic pen position into a personal computer.

In the foregoing implementation, the signal processor is first mounted near a corner of the whiteboard. An image generated by a personal computer is projected onto the whiteboard by a projector. Particular positions on the projected image (for example, four corners) are specified by the electronic pen to store the positions on the projected image in the signal processor. Subsequently, the coordinates are calculated by comparing the position of the electronic pen with the previously stored particular positions, and the calculated coordinates are passed to the personal computer for moving a mouse cursor or the like.

The operation of the foregoing electronic whiteboard system will be described with reference to FIGS. 1A, 1B. As illustrated in FIG. 1A, signal processor 2 mounted on whiteboard 1 comprises infrared ray receiver 20, ultrasonic wave receiver 21, and ultrasonic wave receiver 22. Electronic pen 3 simultaneously emits infrared ray pulse 4 and ultrasonic pulse 5 (the pulse used herein refers to a signal which is only instantaneously generated). Then, taking advantage of the principle of finding the distance to lightning by measuring a time period from the time the lightning is seen to the time associated thunder is heard, signal processor 2 can know the distances from electronic pen 3 to ultrasonic wave receivers 21, 22 by measuring time periods from the time infrared pulse 4 impinges on infrared ray receiver 20 to the time ultrasonic waves impinge on ultrasonic wave receivers 21, 22. Since ultrasonic wave receivers 21, 22 are fixed on signal processor 2, the position of electronic pen 3 viewed from ultrasonic wave receivers 21, 22 can be found from the principle of triangulation (the position of a certain point can be calculated if the distances from different two points to the certain point are known).

Bearing the foregoing in mind, as illustrated in FIG. 1B, an image is projected onto a whiteboard from a projector, and upper left corner 61, upper right corner 62, lower left corner 63, and lower right corner 64 are specified by electronic pen 3 on the projected image 6 to store the position of projected image 6 in signal processor 2 (initialization of coordinates). Subsequently, when electronic pen 3 is used within projected image 6, the position of electronic pen 3 on image 6 can be calculated by comparing the position of the projected image with electronic pen 3. As a result, the coordinates of electronic pen 3 can be delivered to a personal computer, the mouse cursor can be moved over image 6, an icon oh the screen can be specified by electronic pen 3, and so on.

There is another exemplary electronic whiteboard which eliminates the initialization by installing a plurality of ultrasonic wave receivers at the corners of a writing surface on a whiteboard (see, for example, Japanese Patent Laid-open Publication No. 333314/2002 (page 3, FIG. 5) and Japanese Patent Laid-open Publication No. 125736/2001 (pages 3-13, FIG. 1)).

However, in the prior art example which involves the initialization of the coordinates, the burdensome initialization is required for every change in the position and/or distance of projection from the projector to the whiteboard.

On the other hand, in the prior art examples described in Japanese Patent Laid-open Publication No. 333314/2002 and Japanese Patent Laid-open Publication No. 125736/2001 which can omit the initialization by mounting a plurality of ultrasonic wave receivers, which define positional references, at the corners of the writing surface on the whiteboard, unless the sides of a projected image are fitted to the ends of the writing surface, the coordinates on the writing surface does not match the coordinates of the projected image. Inconveniently, this entails requirements for fixing the position and angle with which the projector projects images onto the whiteboard, or for readjusting the projecting conditions for each projection. The aforementioned signal processor is advantageous in that it can be mounted on any wall surface, and the projector can freely project images of any desired sizes as well.

The prior art examples described in JP-2002-333314-A and JP-2001-125736-A spoil the foregoing freedom.

SUMMARY OF THE INVENTION

The present invention has been made in view of the problems of the prior art examples as mentioned above, and it is an object of the invention to provide a projector which is capable of readily initializing the coordinates by imaging light emitting elements mounted on ultrasonic wave receivers of a signal processor, and a projected image from a projector by an imager device to find the positional relationship between the light emitting elements and the projected image from the projector, as well as an electronic whiteboard system using the projector, and a method of acquiring an indicated point.

To solve the foregoing problems, a projector of the present invention is associated with an electronic pen including an infrared ray emitter and an ultrasonic wave generator and operated on a whiteboard, and a signal processor having an infrared ray receiver for receiving infrared ray emitted from the electronic pen, at least two or more ultrasonic wave receivers each for receiving the ultrasonic wave emitted by the electronic pen, and a plurality of light emitting elements disposed substantially at the same positions as the plurality of ultrasonic wave receivers. The projector includes projecting means for projecting a plurality of bright spots onto the whiteboard, imaging means for capturing light emitted by the plurality of light emitting elements and the plurality of bright spots, and a function of acquiring the position of the electronic pen on the whiteboard.

Another projector of the present invention is associated with an electronic pen including an infrared ray emitter and an ultrasonic wave generator and operated on a whiteboard, and a signal processor having an infrared ray receiver for receiving infrared ray emitted from the electronic pen, at least two or more ultrasonic wave receivers each for receiving the ultrasonic wave emitted by the electronic pen, and a plurality of light emitting elements disposed substantially at the same positions as the plurality of ultrasonic wave receivers. The projector includes projecting means for projecting a plurality of bright spots onto the whiteboard, imaging means for capturing light emitted by the plurality of light emitting elements and the plurality of bright spots, and output means for acquiring information on the position of the electronic pen on the whiteboard from the output of the infrared ray receiver and the outputs of the ultrasonic wave receivers, acquiring information on the position of each of the plurality of bright spots on the whiteboard from a picture captured by the imaging means and including the light emitted by the plurality of light emitting elements and the plurality of bright spots, and normalizing the information on the position of the electronic pen on the whiteboard with the information on the positions of the plurality of bright spots on the whiteboard to deliver a normalized version of coordinate data of the electronic pen.

The information on the position of the electronic pen on the whiteboard is calculated from the distances between the electronic pen and two of the plurality of ultrasonic wave receivers, and the distance between the two ultrasonic wave receivers. The information on the position of each of the plurality of bright spots on the whiteboard is calculated from the spacings between the image of each bright spot included in the picture captured by the imaging means and the images of the respective light emitting elements included in the picture captured by the imaging means and disposed substantially at the same positions as the two of the plurality of ultrasonic wave receivers, and the spacing between the images of the two light emitting elements.

The information on the position of the electronic pen on the whiteboard may include the distance between the electronic pen and a median point of two of the plurality of ultrasonic wave receivers divided by the distance between the two ultrasonic wave receivers, and an angle formed by a line connecting the two ultrasonic wave receivers to each other with a line connecting the electronic pen to the median point. Also, the information on the position of each of the plurality of bright spots on the whiteboard may include the spacing between the image of each bright spot included in the picture captured by the imaging means and a midpoint between images of the two light emitting elements included in the picture captured by the imaging means, divided by the spacing between the images of the two light emitting elements disposed at the same positions as the two of the plurality of ultrasonic wave receivers, and an angle formed by a line which connects the images of the two light emitting elements on the captured picture to each other with a line which connects the image of each bright spot to the midpoint.

An electronic whiteboard system of the present invention is for use with a projector, wherein the projector includes a signal processor having an infrared ray receiver for receiving infrared ray emitted from an electronic pen including an infrared ray emitter and an ultrasonic wave generator and operated on a whiteboard, at least two or more ultrasonic wave receivers each for receiving the ultrasonic wave emitted by the electronic pen, and the same number of light emitting elements as the plurality of ultrasonic wave receivers, disposed substantially at the same positions as the plurality of ultrasonic wave receivers, projecting means for projecting a plurality of bright spots onto the whiteboard, imaging means for capturing light emitted by the plurality of light emitting elements and the plurality of bright spots, and a function of acquiring the position of the electronic pen on the whiteboard.

Another electronic whiteboard system of the present invention is for use with a projector, wherein the projector includes a signal processor having an infrared ray receiver for receiving infrared ray emitted from an electronic pen including an infrared ray emitter and an ultrasonic wave generator and operated on a whiteboard, at least two or more ultrasonic wave receivers each for receiving the ultrasonic wave emitted by the electronic pen, and the same number of light emitting elements as the plurality of ultrasonic wave receivers, disposed substantially at the same positions as the plurality of ultrasonic wave receivers, projecting means for projecting a plurality of bright spots onto the whiteboard, and imaging means for capturing light emitted by the plurality of light emitting elements and the plurality of bright spots, wherein the signal processor comprises output means for acquiring information on the position of the electronic pen on the whiteboard from the output of the infrared ray receiver and the outputs of the ultrasonic wave receivers, and delivering the acquired information to the projector, and the projector further comprises output means for acquiring information on the positions of the plurality of bright spots on the whiteboard from a picture captured by the imaging means and including the light emitted by the plurality of light emitting elements and the plurality of bright spots, and for normalizing the output of the signal processor with the information on the positions of the plurality of bright spots on the whiteboard to deliver a normalized version of coordinate data of the electronic pen.

The information on the position of the electronic pen on the whiteboard is calculated from the distances between the electronic pen and two of the plurality of ultrasonic wave receivers, and the distance between the two ultrasonic wave receivers. The information on the position of each of the plurality of bright spots on the whiteboard is calculated from the spacings between the image of each bright spot included in the picture captured by the imaging means and the images of the respective light emitting elements included in the picture captured by the imaging means and disposed substantially at the same positions as the two of the plurality of ultrasonic wave receivers, and the spacing between the images of the two light emitting elements.

The information on the position of the electronic pen on the whiteboard may include the distance between the electronic pen and a median point of two of the plurality of ultrasonic wave receivers divided by the distance between the two ultrasonic wave receivers, and an angle formed by a line connecting the two ultrasonic wave receivers to each other with a line connecting the electronic pen to the median point. Also, the information on the position of each of the plurality of bright spots on the whiteboard may include the spacing between the image of each bright spot included in the picture captured by the imaging means and a midpoint between images of the two light emitting elements included in the picture captured by the imaging means, divided by the spacing between the images of the two light emitting elements and disposed at the same positions as the two of the plurality of ultrasonic wave receivers, and an angle formed by a line which connects the images of the two light emitting elements on the captured picture to each other with a line which connects the image of each bright spot to the midpoint.

A method of acquiring the coordinates of an indicated point according to the present invention is for use in an electronic whiteboard system associated with a projector, wherein the projector includes a signal processor having an infrared ray receiver for receiving infrared ray emitted from an electronic pen including an infrared ray emitter and an ultrasonic wave generator and operated on a whiteboard, at least two or more ultrasonic wave receivers each for receiving the ultrasonic wave emitted by the electronic pen, and the same number of light emitting elements as the plurality of ultrasonic wave receivers, disposed substantially at the same positions as the plurality of ultrasonic wave receivers, projecting means for projecting a plurality of bright spots onto the whiteboard, and Imaging means for capturing light emitted by the plurality of light emitting elements and the plurality of bright spots. The method includes the steps of the projector lighting the light emitting elements to project a plurality of bright spots on the whiteboard, the signal processor acquiring information on the position of the electronic pen on the whiteboard from the output of the infrared ray receiver and the outputs of the ultrasonic wave receivers to deliver the information to the projector, and the projector acquiring information on the positions of the plurality of bright spots on the whiteboard from a picture captured by the imaging means, the picture including the light emitted by the plurality of light emitting elements and the plurality of bright spots, and normalizing the output of the signal processor with the information on the positions of the plurality of bright spots on the whiteboard to deliver the normalized coordinate data of the electronic pen.

The information on the position of the electronic pen on the whiteboard is calculated from the distances between the electronic pen and two of the plurality of ultrasonic wave receivers, and the distance between the two ultrasonic wave receivers. The information on the position of each of the plurality of bright spots on the whiteboard is calculated from the spacings between the image of each bright spot included in the picture captured by the imaging means and the images of the respective light emitting elements included in the picture captured by the imaging means and disposed substantially at the same positions as the two of the plurality of ultrasonic wave receivers, and the spacing between the images of the two light emitting elements.

The information on the position of the electronic pen on the whiteboard may include the distance between the electronic pen and a median point of two of the plurality of ultrasonic wave receivers divided by the distance between the two ultrasonic wave receivers, and an angle formed by a line connecting the two ultrasonic wave receivers to each other with a line connecting the electronic pen to the median point. Also, the information on the position of each of the plurality of bright spots on the whiteboard may include the spacing between the image of each bright spot included in the picture captured by the imaging means and a midpoint between images of the two light emitting elements included in the picture captured by the imaging means, divided by the spacing between the images of the two light emitting elements disposed at the same positions as the two of the plurality of ultrasonic wave receivers, and an angle formed by a line which connects the images of the two light emitting elements on the captured picture to each other with a line which connects the image of each bright spot to the midpoint.

The electronic whiteboard system of the present invention can automatically initialize the coordinates in a simple manner by imaging the light emitting elements mounted on the ultrasonic wave receivers of the signal processor and a projected image of the projector by the imager device to find the positional relationship between the light emitting elements and the projected image of the projector, thus eliminating the burdensome initialization which would have been otherwise performed by the user for every change in the projecting position and distance of the projector to the whiteboard as required by the prior art example.

In addition, the present invention need not maintain constant the projecting position and angle of the projector to the whiteboard, and eliminates the inconvenience of adjusting the projection conditions for each projection, as would be required for the prior art example which has a plurality of ultrasonic wave receivers at corners of the writing surface of the whiteboard to define positional references.

The present invention further makes the most of the ability to freely mount the signal processor on any wall surface, and the ability to freely project images of preferred sizes from the projector.

The above and other objects, features, and advantages of the present invention will become apparent from the following description with reference to the accompanying drawings, which illustrate examples of the present invention.

DETAILED DESCRIPTION OF THE PREFERRED EMBODIMENTS

Figure 1A:
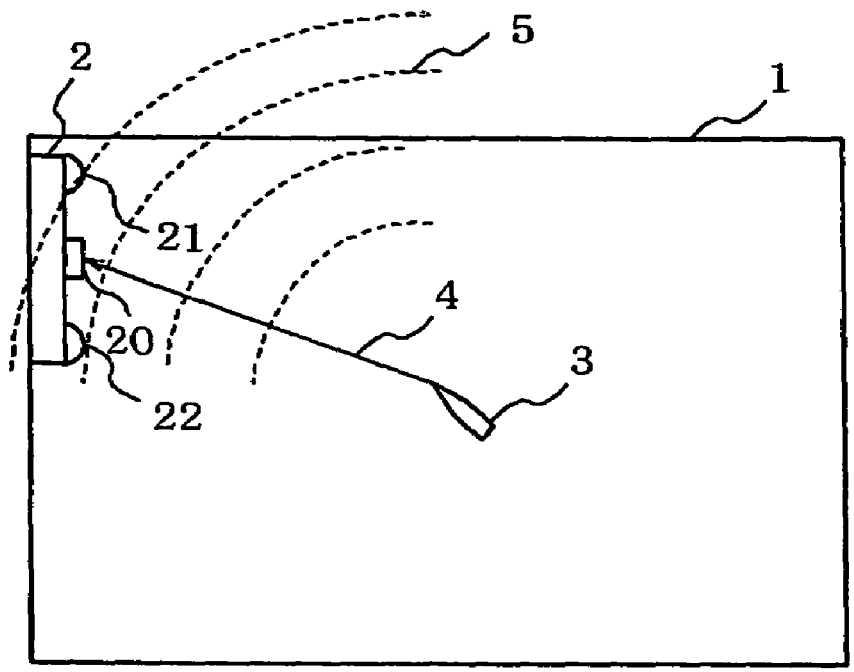
FIGS. 1A and 1B are diagrams each illustrating an implementation of a conventional electronic whiteboard system using a projector.
Figure 1B:
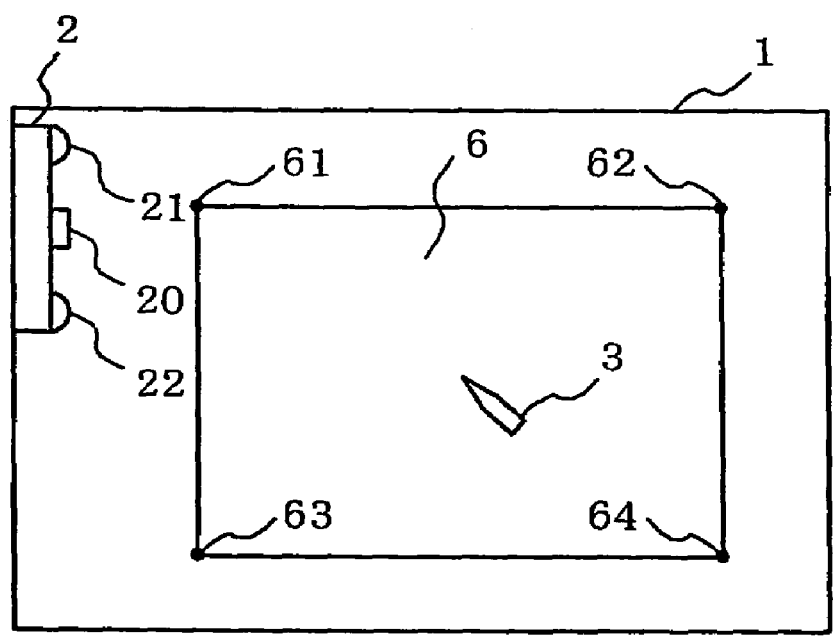
Figure 2:
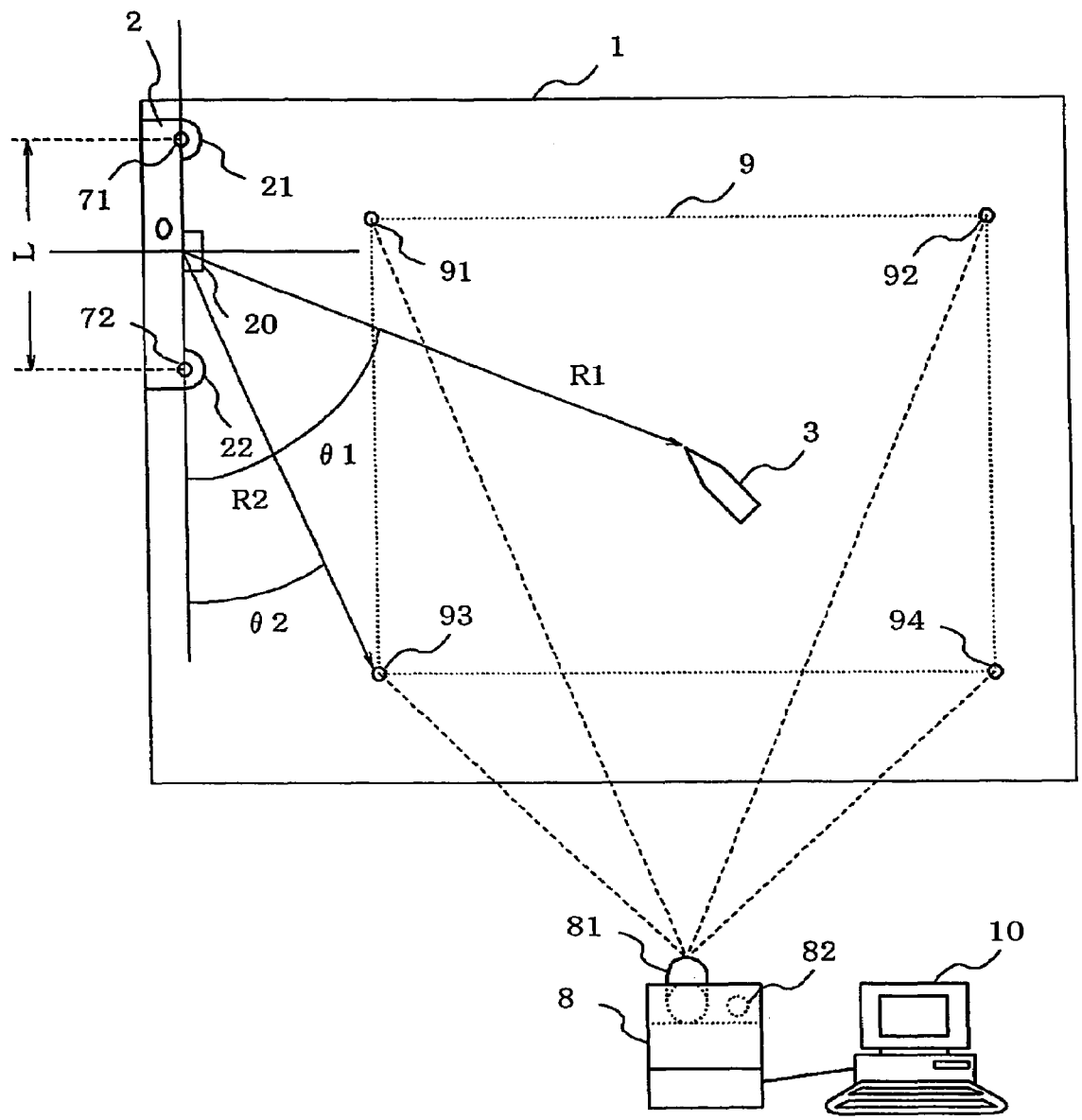
FIG. 2 is a diagram illustrating an embodiment of an electronic whiteboard system using a projector of the present invention.

FIG. 2 illustrates one embodiment of an electronic whiteboard system using a projector of the present invention. This electronic whiteboard system comprises whiteboard 1, signal processor 2 mounted at a corner of whiteboard 1, electronic pen 3 for drawing a figure on whiteboard 1, lens projection type projector 8, and personal computer 10.

Electronic pen 3 includes an infrared ray emitter and a ultrasonic wave generator.

Figure 3:
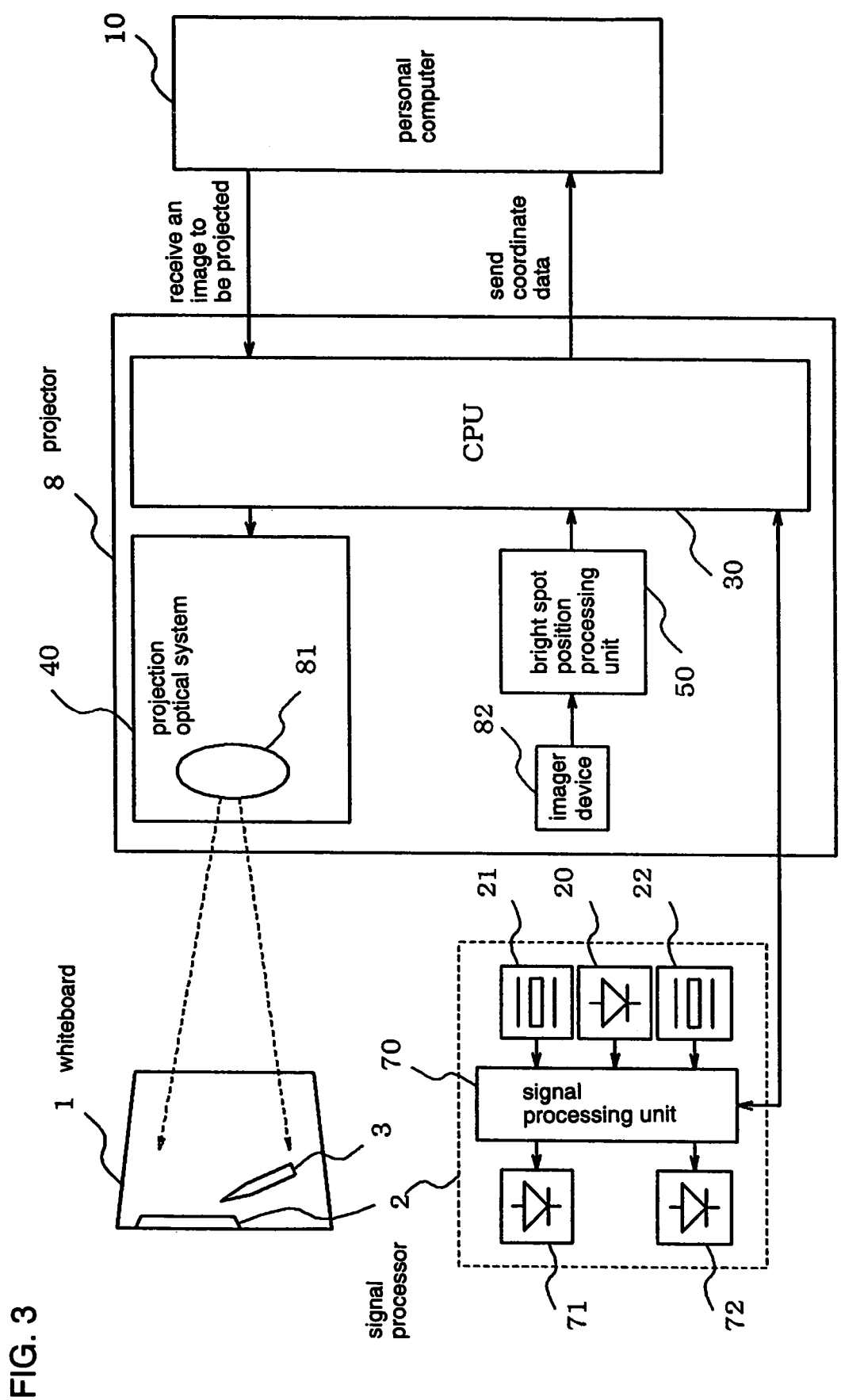
FIG. 3 is a block diagram illustrating the configuration of the electronic whiteboard system using the projector of the present invention.

FIG. 3 illustrates a block diagram of the configuration of the electronic whiteboard system using the projector of the present invention.

Signal processor 2 comprises signal processing unit 70, ultrasonic wave receivers 21, 22, and light emitting elements 71, 72 disposed respectively on ultrasonic wave receivers 21, 22. Signal processing unit 70 measures time periods from the time an infrared pulse from electronic pen 3 impinges on infrared ray receiver 20 to the time ultrasonic waves impinge on ultrasonic wave receivers 21, 22 to measure the distances from electronic pen 3 to ultrasonic wave receivers 21, 22, respectively, and calculates length R1 and angle θ1 of a vector which connects the center O between ultrasonic wave receivers 21, 22 to electronic pen 3 in accordance with the principle of triangulation from the measured distances and previously known distance L between ultrasonic wave receivers 21, 22. Then, signal processing unit 70 normalizes length R of the vector by distance L between ultrasonic wave receivers 21, 22 (also the distance between light emitting elements 71, 72) to derive R1/L which is delivered to projector 8 together with angle θ1.

Projector 8 comprises CPU 30, projection optical system 40, imager device 82, bright spot position processing unit 50.

Projection optical system 40 comprises projection lens 81. Imager device 82 is disposed near projection lens 81 for imaging whiteboard 1.

Bright spot position processing unit 50 extracts each of bright spots 91, 92, 93, 94 on a test pattern projected onto whiteboard 1 by projection optical system 40, and bright spots of light emitted by light emitting elements 71, 72 disposed on the centers of ultrasonic wave receivers 21, 22, respectively, of signal processor 2 from a video signal captured by imager device 82 through peak detection, and calculates length R2 and angle θ2 of a vector which connects the center 0 between light emitting elements 71, 72 to each bright spot 91, 92, 93, 94 on the test pattern. Then, bright spot position processing unit 50 normalizes R2 with distance L between light emitting elements 71, 72 to derive R2/L which is delivered to CPU 30 together with angle θ2.

CPU 30 sends a projection image signal to be applied to a light bulb (not shown) of the projection optical system. CPU 30 also normalizes the coordinates of electronic pen 3 delivered from signal processing unit 70 with the coordinates of the bright spot on the test pattern, calculated during the initialization, delivered from bright point position processing unit 50, and sends the normalized coordinates to a personal computer or the like external to projector 8 as coordinate data. CPU 30 holds video signals representative of test patterns 91, 92, 93, 94 indicative of four corners of an image projected from projection optical system 8 during the initialization (alternatively, any two points are sufficient if the aspect ratio of the projected image is known).

Personal computer 10 delivers an image on its display to projector 8 as an image to be projected, and receives coordinate data of the position of electronic pen 3 from projector 8.

Next, description will be made on the operation of the electronic whiteboard system according to this embodiment.

For initializing the coordinates, CPU 30 turns on light emitting elements 71, 72 included in signal processor 2, and projects projection test pattern 9 which has bright spots at four corners of the image.

Imager device 82 images this state, and applies the resulting video signal to bright spot position processing unit 50.

Bright spot position processing unit 50 extracts each of the bright spots on test pattern 9 projected onto whiteboard 1 by projection optical system 40, and bright spots of light emitting elements 71, 72 disposed on the centers of ultrasonic wave receivers 21, 22, respectively, of signal processor 2 from the video signal captured by imager device 82 through peak detection, and calculates length R2 and angle θ2 of a vector which connects center O between light emitting elements 71, 72 to each bright spot on test pattern 9. Then, bright spot position processing unit 50 normalizes R2 with distance L between light emitting elements 71, 72 to derive R2/L which is delivered to CPU 30 together with θ2.

CPU 30 stores data on R2/L derived from the normalization of R2 with distance L between light emitting elements 71, 72 and angle θ2 in a memory.

CPU 30 terminates the projection of test pattern 9, and switches to an input image displayed by personal computer 10 for projection onto whiteboard 1.

The user may manipulate electronic pen 3 within the projected image displayed on whiteboard 1.

Electronic pen 3 transmits an infrared pulse and an ultrasonic wave pulse at regular intervals. Infrared ray receiver 20 and ultrasonic wave receivers 21, 22 of signal processor 2 receive the infrared pulse and ultrasonic wave pulse, respectively.

Signal processing unit 70 measures time periods from the time the infrared pulse from electronic pen 3 impinges on infrared ray receiver 20 to the time the ultrasonic wave impinges on ultrasonic wave receivers 21, 22 to measure the respective distances from electronic pen 3 to ultrasonic wave receivers 21, 22, and calculates length R1 and angle θ1 of a vector which connects the center between ultrasonic wave receivers 21, 22 to electronic pen 3 in accordance with the principle of triangulation from the measured distances and previously known distance L between ultrasonic wave receivers 21, 22. Then, signal processing unit 70 normalizes length R of the vector with the distance L between ultrasonic wave receivers 21, 22 (which is the distance between light emitting elements 71, 72 as well) to derive R1/L which is delivered to CPU 30 together with angle θ1.

CPU 30 additionally writes coordinates L1/L and θ1 indicative of the position of electronic pen 3 represented in cylindrical coordinates into the memory which has previously stored R2/L and θ2 which represent the coordinates of the bright point on test pattern 9 likewise in cylindrical coordinates. Then, CPU 30 converts the cylindrical coordinates into Cartesian coordinates in which four corners 91-94 of test pattern 9 are defined to be vertices of a rectangle, normalizes the converted coordinates R1/L and θ1 with the rectangle, and sequentially delivers coordinate data of electronic pen 3 resulting from the normalization.

Personal computer 10 can use the resulting coordinate data for overwriting a drawing trajectory of electronic pen 3 on a displayed image, moving the cursor through movements of electronic pen 3, and the like.

What is claimed is:

1. A projector associated with an electronic pen including an infrared ray emitter and an ultrasonic wave generator and operated on a whiteboard, and associated with a signal processor having an infrared ray receiver for receiving an infrared ray emitted from said electronic pen, at least two or more ultrasonic wave receivers each for receiving an ultrasonic wave emitted by said electronic pen, and a plurality of light emitting elements disposed substantially at the same positions as said plurality of ultrasonic wave receivers, said projector comprising:

projecting means for projecting a plurality of bright spots onto said whiteboard;

imaging means for imaging light emitted by said plurality of light emitting elements and said plurality of bright spots;

output means for acquiring information on a position of said electronic pen on said whiteboard from an output of said infrared ray receiver and outputs of said ultrasonic wave receivers, acquiring means for acquiring information on positions of said plurality of bright spots on said whiteboard from a picture captured by said imaging means, said picture including the light emitted by said plurality of light emitting elements and said plurality of bright spots, and normalizing means for normalizing the information on the position of said electronic pen on said whiteboard with the information on the positions of said plurality of bright spots on said whiteboard to deliver normalized coordinate data of said electronic pen; wherein said information on the position of said electronic pen on said whiteboard includes:

a distance between said electronic pen and a median point of two of said plurality of ultrasonic wave receivers divided by a distance between said two ultrasonic wave receivers; and an angle formed by a line connecting said two ultrasonic wave receivers to each other with a line connecting said electronic pen to said median point, and said information on the position of each of said plurality of bright spots on said whiteboard includes:

a spacing between an image of each said bright spot included in the picture captured by said imaging means and a midpoint between images of the two light emitting elements included in the picture captured by said imaging means, divided by a spacing between the images of said two light emitting elements, said two light emitting elements disposed at the same positions as said two of said plurality of ultrasonic wave receivers; and an angle formed by a line which connects the images of said two light emitting elements on said captured picture to each other with a line which connects the image of each said bright spot to said midpoint.

2. An electronic whiteboard system for use with a projector, said system comprising:

a signal processor having an infrared ray receiver for receiving an infrared ray emitted from an electronic pen including an infrared ray emitter and an ultrasonic wave generator and operated on a whiteboard, at least two or more ultrasonic wave receivers each for receiving an ultrasonic wave emitted by said electronic pen, and the same number of light emitting elements as said plurality of ultrasonic wave receivers, disposed substantially at the same positions as said plurality of ultrasonic wave receivers;

projecting means for projecting a plurality of bright spots onto said whiteboard; imaging means for capturing light emitted by said plurality of light emitting elements and said plurality of bright spots, output means for acquiring information on positions of said plurality of bright spots on said whiteboard from a picture captured by said imaging means, said picture including the light emitted by said plurality of light emitting elements and said plurality of bright spots, and means for normalizing an output of said signal processor with the information on the positions of said plurality of bright spots on said whiteboard to deliver a normalized version of coordinate data of said electronic pen; wherein:

said signal processor comprises output means for acquiring information on a position of said electronic pen on said whiteboard from an output of said infrared ray receiver and outputs of said ultrasonic wave receivers, and delivering the acquired information to said projector; wherein said information on the position of said electronic pen on said whiteboard includes:

a distance between said electronic pen and a median point of two of said plurality of ultrasonic wave receivers divided by a distance between said two ultrasonic wave receivers; and an angle formed by a line connecting said two ultrasonic wave receivers to each other with a line connecting said electronic pen to said median point, and said information on the position of each of said plurality of bright spots on said whiteboard includes:

a spacing between an image of each said bright spot included in the picture captured by said imaging means and a midpoint between images of the two light emitting elements included in the picture captured by said imaging means, divided by a spacing between the images of said two light emitting elements, said two light emitting elements disposed at the same positions as said two of said plurality of ultrasonic wave receivers; and an angle formed by a line which connects the images of said two light emitting elements on said captured picture to each other with a line which connects the image of each said bright spot to said midpoint.

3. A method of acquiring coordinates of an indicated point for use in an electronic whiteboard system associated with a projector, said method comprising:

projecting a plurality of bright spots on said whiteboard;

acquiring information on a position of said electronic pen on said whiteboard from an output of an infrared ray receiver and outputs of ultrasonic wave receivers to deliver the information to said projector; and acquiring information on positions of a plurality of bright spots on said whiteboard from a picture captured by imaging means, said picture including the light emitted by a plurality of light emitting elements, disposed substantially at the same positions as a plurality of ultrasonic wave receivers, and including said plurality of bright spots, and normalizing said information on a position of said electronic pen with the information on the positions of said plurality of bright spots on said whiteboard to deliver normalized coordinate data of said electronic pen; wherein said information on the position of said electronic pen on said whiteboard includes:

a distance between said electronic pen and a median point of two of said plurality of ultrasonic wave receivers divided by a distance between said two ultrasonic wave receivers; and an angle formed by a line connecting said two ultrasonic wave receivers to each other with a line connecting said electronic pen to said median point, and said information on the position of each of said plurality of bright spots on said whiteboard includes:

a spacing between an image of each said bright spot included in the picture captured by said imaging means and a midpoint between images of the two light emitting elements included in the picture captured by said imaging means, divided by a spacing between the images of said two light emitting elements, said two light emitting elements disposed at the same positions as said two of said plurality of ultrasonic wave receivers; and an angle formed by a line which connects the images of said two light emitting elements on said captured picture to each other with a line which connects the image of each said bright spot to said midpoint.

* * * * *